June 9, 1959 G. STEVEN ET AL 2,889,682
TWO-CYCLE INTERNAL COMBUSTION ENGINE
Filed Nov. 20, 1956 3 Sheets-Sheet 1

GEORGE STEVEN
WILLIAM M. KAUFFMANN
INVENTORS

BY Daniel A. Bobis
atty

GEORGE STEVEN
WILLIAM M. KAUFFMANN
INVENTORS

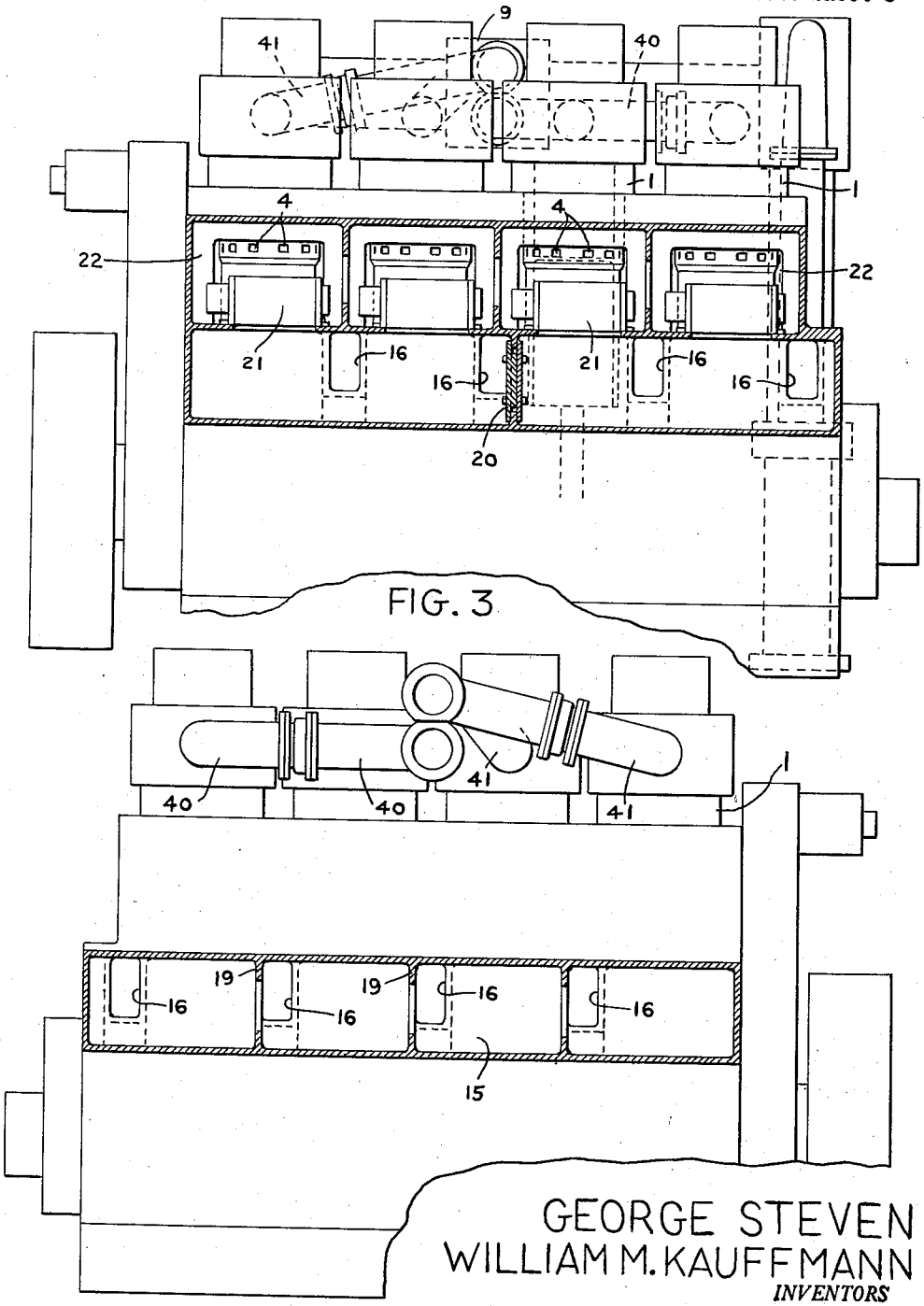

United States Patent Office 2,889,682
Patented June 9, 1959

2,889,682
TWO-CYCLE INTERNAL COMBUSTION ENGINE

George Steven, Kenmore, and William M. Kauffmann, Hamburg, N.Y., assignors to Worthington Corporation, Harrison, N.J., a corporation of Delaware Application November 20, 1956, Serial No. 623,425

10 Claims. (Cl. 60—13)

This invention relates to two cycle internal combustion engines and more particularly to a turbochanging system for spark ignition gas engines, which may, however be applicable to dual fuel internal combustion engines or diesel engines.

It has been found by research, that during the scavenging process of two cycle engines thereare disturbing pulsations or variations of pressure of considerable magnitude created by the gas movements in the working cylinder of the engine. These pulsations result from the very high velocity imparted to the gases in the induction system. The effect of these variations in pressure is an irregular pattern of air distribution to the individual cylinders of multi-cylinder engines, which affects air fuel ratio and engine combustion balance. Such action is particularly serious in gas engines, where unbalanced combustion may become so critical as to result in rough operation of the engine.

An object of the present invention is to improve the scavenging efficiency of two cycle uniflow engines by providing means for reducing, or eliminating such pulsations or variations of pressure in the induction system of turbocharged engines.

Another object of the present invention is to provide in combination, a manifold common to all of the cylinders of the engine which receives and equalizes over its length the pressure air discharged by the turboblower, together with a series of crossflow passages to a second divided manifold which discharges the pressure air into a series of separate plenum chambers, one for each cylinder and having substantial volume to minimize the pulsation effect during the scavenging period, through individual air intercoolers, in which combination the divided second or secondary manifold serves to increase the frequency of the air column pulsation and reduce their magnitude to a minimum while the plenum chambers serve to dampen the scavenging pulsations.

Another object of the present invention is to provide an arrangement and combination of exhaust piping for delivering the exhaust gases from the engine cylinders to the turbine or turbines of the turboblower or turboblowers which will improve scavenging efficiency of the engine by avoiding interference of exhaust and air charging sequence and an arrangement of exhaust piping which also permits using a single turbocharger for 3, 4, 5 and 6 cylinder engines and two turbochargers for 7, 8 and 10 cylinder engines. With the arrangement of the exhaust piping of the present invention, a firing order or sequence of the cylinders may be provided which will permit two or three adjacent cylinders to be joined into one exhaust pipe.

A further object of the present invention is to provide means, in the form of through flow air intercoolers in the air flow path from the secondary manifold to the plenum chambers, to insure uniform distribution of scavenging air quantity to the individual cylinders and to minimize change in density of the air by moving the air in a vertical direction so that it is deflected toward the intake ports of the cylinders almost in line with these openings, thus obtaining the shortest distance and minimum heating of the cooled charge of air prior to its entry into the cylinder.

With these and other objects in view, as may appear from the accompanying specification, the invention consists of various features of construction and combination of parts, which will be first described in connection with the accompanying drawings, showing a Two Cycle Internal Combustion Engine of a preferred form embodying the invention and the features forming the invention will be specifically pointed out in the claims.

In the drawings:

Figure 3 is a view partly in elevation and showing the secondary manifold (divided by a partition) with the cross passages and showing the plenum chambers in section, and taken on line 3—3 of Figure 1.

Figure 4 is a longitudinal section through the primary air manifold taken on line 4—4 of Figure 1.

The drawings show and the following description will describe a two cycle spark ignition gas engine but it is to be understood that the features forming the present invention may be applied to internal combustion engines of the diesel type or to dual fuel internal combustion engines without departing from the spirit of the present invention.

The internal combustion engine of the present invention includes the usual cylinder or cylinders 1 in which a piston 2 reciprocates for operating the power take off crank shaft 3.

Figure 2:
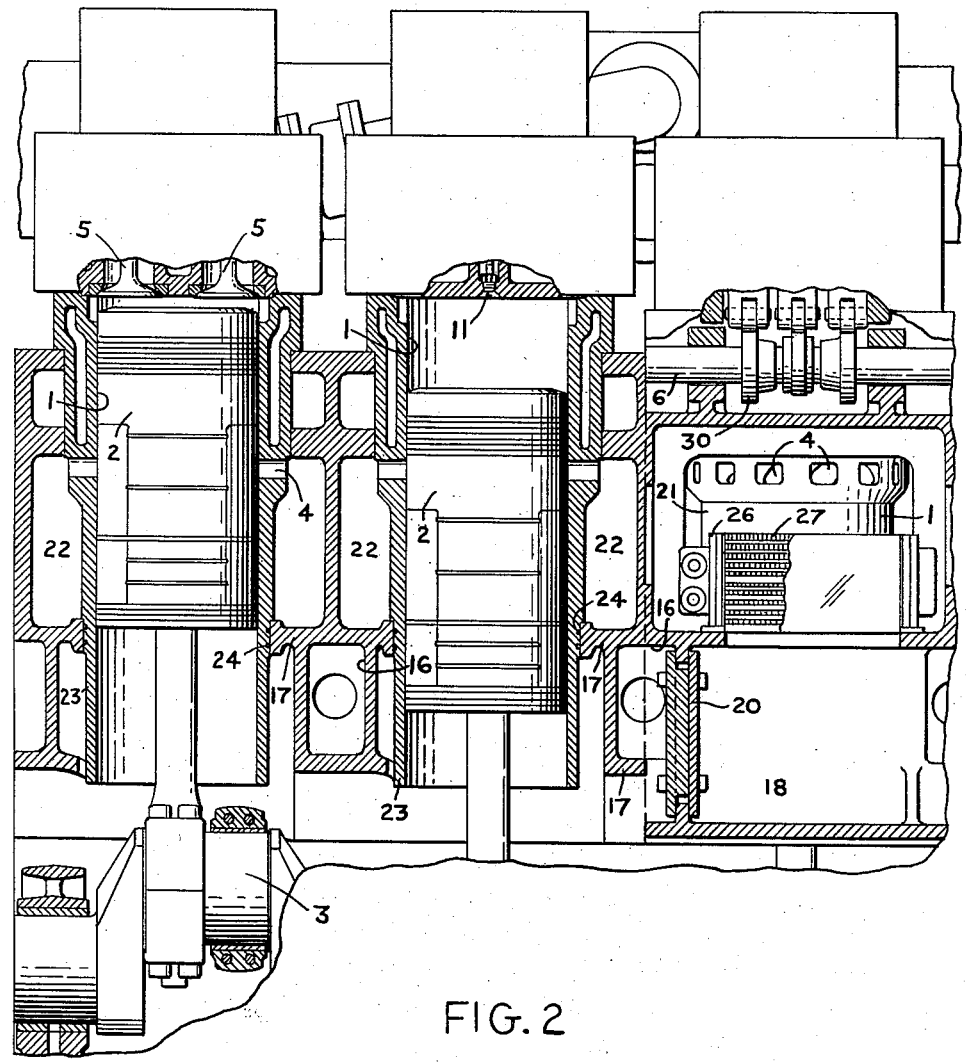
Figure 2 is a vertical longitudinal section through an engine constructed in accordance with the present invention and showing sections through individual cylinders of the engine at different vertical planes through the engine to show general relationship of the various parts.

The cylinder 1 is provided with a row inlet ports 4 encircling the cylinder which ports 4 are controlled by the piston 2. The cylinder 1 has dual exhaust ports 5 (see Fig. 2) which are normally of the poppet type, controlled and operated by a cam shaft 6 driven in any suitable manner (not shown) from the crank shaft 3 of the engine.

Exhaust gases from the combustion chamber 7 in the cylinder 1 are transmitted through relatively short exhaust pipes 8 to a turbocharger 9. The turbocharger 9 may be of any well known type of turbocharger embodying a turbine wheel (not shown) which is operated by the exhaust gases from the combustion chamber 7 and a compressor (not shown) which is operated by the turbine wheel, receives air through an intake pipe 10, compresses the air and discharges it into the air intake system of the engine. One or more turbochargers are employed depending upon the number of cylinders of the engine as, for instance, a single turbocharger for 3, 4, 5 or 6 cylinder engines and a double or two turbochargers for engines having 7, 8 or 10 cylinders. By selection of suitable firing orders for each engine combination of cylinders, a relatively symmetrical disposition of exhaust pipes may be obtained.

Air is admitted into the combustion chamber 7 of each engine cylinder through the piston controlled intake ports 4 at the lower portion of the cylinder and gas is injected under pressure by a timed valve (not shown) into the cylinder and is mixed with the trapped air in the combustion chamber, after the ports 4 are closed by the cylinder as is usual in approved types of two cycle gas engines. The mixed gas and air charge in the combustion chamber is ignited or fired by a spark plug 11.

In the engine forming the present invention the supercharging pressure air from the turbocharger 9 is discharged through a pipe 14 into a primary pressure equalizing manifold 15 which extends along the engine at the turbocharger side thereof. Relatively large cross passages 16 extend from the partial partitions 19 in manifold 15 across through the lower portion of the engine frame housing 17 and open into a secondary manifold 18 extending along the side of the engine opposite from the primary manifold 15.

This secondary manifold provided with the full partition 20, for dividing the volume of the air column in order to increase the frequency and reduce the amplitude of air pulsations throughout the respective length of each section thus formed.

From the secondary manifold 18 the supercharging air passes through intercoolers 21, one for each engine cylinder, into annular plenum chambers 22 formed in the cylinder liner housing 23. The plenum chambers 22 have relatively substantial volume to minimize pulsation effect during the scavenging period of the engine and open into the combustion chambers through the intake ports 4. The plenum chambers are sealed, thus providing individual chambers for each cylinder, and the seals shown at 24 at the lower portions of the cylinder lines seal the chambers from the crank case 25 of the engine but permit the cylinder liner 23 to expand or contract under temperature variances.

The intercoolers 21 may be of any approved type, those shown in the drawings constituting housings 26 providing vertical flow path for the air passing therethrough from the secondary manifold 18 to the plenum chambers 22. During the flow of the air through the housings 26 of the intercoolers it passes over a series of tubes 27, through which cooling water is circulated from any suitable source not shown, by means of suitable piping 28.

Figure 1:
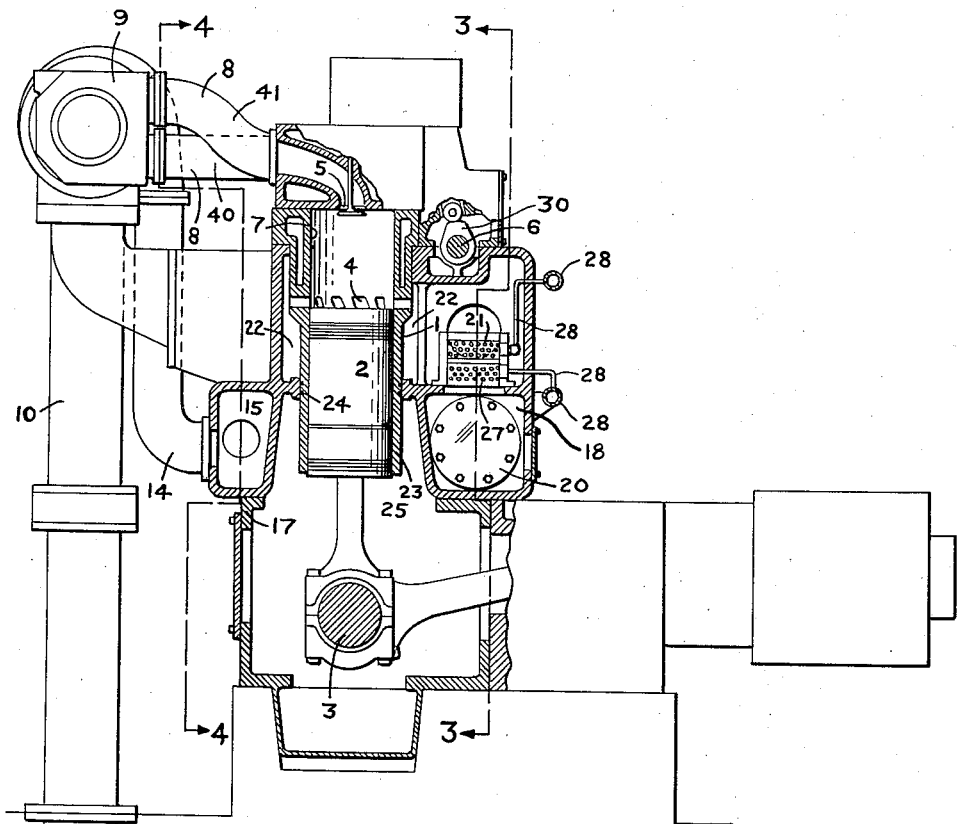
Figure 1 is a vertical cross section through a two cycle internal combustion engine constructed in accordance with the present invention.

The vertical movement of the air after passing through the intercoolers is deflected towards the air intake ports almost in line with these ports as clearly shown in Figure 1 of the drawings (due to the height of the after cooler housing and the relative position thereto of the top of the plenum chambers) thus obtaining the shortest travel distance and minimum heating of the cooled air charge prior to its entry into the cylinder 1. This minimizes change in density of the air which would otherwise result with uneven or extensive heating from a longer path of flow.

The combustion cycle of the engine consists of air admission through the intake ports 4, controlled by movement of the piston 2, gas is injected under pressure by a timed valve (not shown) into the combustion chamber and is mixed with the air trapped in the combustion chamber after the piston closes the intake ports 4. At near top center of the piston stroke the mixture of air and gas is ignited by a spark from the spark plug 11, forcing the piston 2 downward. As the piston moves downward on the power stroke, the exhaust valves are opened by the cam 30 on the cam shaft 6 at about midstroke of the piston or 90 degrees after top center. The energy of the exhaust gases at this point is sufficient to generate an exhaust pulse of large magnitude but of short duration. This pulse of the exhaust gases is sustained by a virtual constant area relatively short section piping to the turbocharger. The pressure of this pulse of the exhaust gases is reduced to approximately scavenge pressure at the instant the piston uncovers the intake ports 4.

Figure 5:
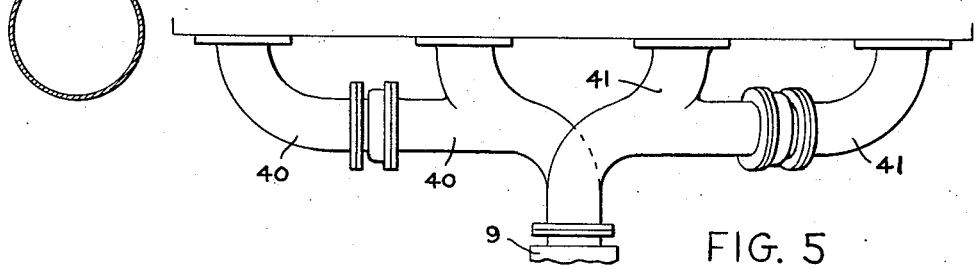
Figure 5 is a view showing the arrangement of the exhaust piping in plan.

The virtual constant area relatively short piping sections which convey the exhaust gases are shown in Figure 5 of the drawings wherein a four cylinder engine is shown. In a four cylinder engine the exhaust pipes 40 of two cylinders are connected all being of uniform cross sectional area and open into the turbocharger through an outlet equal to said cross sectional area, while the exhaust pipes 41 of the other two cylinders are connected to each other, are of uniform cross sectional area and open through an outlet equal to their cross sectional area into the turbocharger. For a six cylinder engine the exhaust pipes of two or three cylinders would be connected together, etc. for various multiple cylinder engines, always to provide relatively short lengths of exhaust piping of uniform cross sectional area from the combustion chambers to the turbocharger.

By selection of suitable firing orders of the cylinders for each engine combination of cylinders, a relatively symmetrical disposition of the exhaust pipes may be obtained.

The arrangement of the exhaust piping will improve scavenging efficiency of the engine by avoiding interference of exhaust and air charging sequence. Also the arrangement permits the use of a single turbocharger for 3, 4, 5 and 6 cylinder engines and two turbochargers for 7, 8 and 10 cylinder engines, and by arrangement of the firing orders of the cylinders the same exhaust piping arrangement and configuration may be used for 8 cylinders as for 4 cylinders, and likewise for 10 cylinder engines two sets of 5 cylinder piping may be used. For 7 cylinder engines one set of exhaust piping for 3 cylinders and one set for 4 cylinders may be employed with two turbochargers.

The combined volume of plenum chambers, primary and secondary manifolds found necessary to effectively eliminate pulsation in the induction system should equal approximately seven times the total cylinder displacement of the engine. The total volume of each exhaust pipe to turbocharger must be approximately one cylinder displacement to properly sustain the exhaust pulse without interference, or unnecessary and undesirable disturbance during the scavenge period to an adjacent cylinder. It follows then that the total volume of the exhaust piping is at least substantially equal to the total displacement of the engine.

It will be understood that the invention is not to be limited to the specific construction or arrangement of parts shown, but that they may be modified within the invention defined by the claims.

What is claimed is:

1. In an internal combustion engine including an engine frame, cylinders having intake ports therein controlled by the piston and valve-controlled exhaust ports, and a piston in the cylinder and a turbocharger for providing pressure intake air to the engine, primary and secondary intake air manifolds on opposite sides of said frame, said frame having crossflow passages therein connecting said manifolds, partition means in said secondary manifold for dividing the volume of air flowing thereto in order to increase the frequency and reduce the amplitude of air pulsations throughout the respective portions formed by said partition means, a plenum chamber surrounding each of said cylinders and having air inlet communication with said secondary manifold and outlet communication to the cylinder and said plenum chambers formed by the frame of said engine and the walls of each of said cylinders.

2. An internal combustion engine as claimed in claim 1 having at least two systems of exhaust piping including pipe means connecting the cylinders to the turbocharger, both of said exhaust piping systems so arranged together with the firing order of the cylinders that at least two adjacent cylinders discharge into one of said systems, and said pipe means being of uniform cross-sectional area throughout their length.

3. An internal combustion engine as claimed in claim 1, including an intercooler in each plenum chamber for cooling the intake air as it enters the plenum chamber.

4. An internal combustion engine as claimed in claim 3, wherein the intake ports are disposed uniformly about the cylinder and wherein said intercooler is disposed in the plenum chamber in such manner as to provide a relatively short path of air flow from the intercooler to said intake ports.

5. An internal combustion engine as claimed in claim 1, wherein the combined volume of the primary and secondary manifolds and the plenum chambers is substantially equal to seven times the total displacement of the engine.

6. An internal combustion engine as claimed in claim 2, wherein the total volume of the exhaust piping systems is at least approximately equal to the displacement volume of the engine.

7. An internal combustion engine as claimed in claim 5, having a relatively short substantially constant area exhaust piping connecting the cylinders to the turbocharger, the total volume of the exhaust piping being at least approximately equal to the displacement volume of the engine.

8. In an internal combustion engine, including an engine frame, cylinders having intake ports therein arranged uniformly about the cylinders and controlled by the pistons, pistons in said cylinders, said cylinders having valve controlled exhaust ports, a primary intake air manifold at one side of said frame, a turbocharger connected to said primary intake air manifold and for providing intake air to said cylinders, a secondary intake air manifold along the other side of said frame, said frame provided with cross passages establishing communication between said primary and secondary manifolds, annular plenum chambers surrounding each cylinder, and having inlets opening into said secondary manifold, said cylinder intake ports opening into said plenum chambers, intercoolers in said plenum chambers at their inlets and extending upwardly into the plenum chambers to approximately the level of the cylinder intake ports to provide substantially the shortest flow path of intake air from the intercoolers and plenum chambers into the cylinders.

9. An internal combustion engine as claimed in claim 8, wherein the combined volume of said primary and secondary manifolds and said plenum chambers is approximately seven times the total displacement of the cylinders of the engine.

10. An internal combustion engine as claimed in claim 9, including an exhaust piping system connecting said cylinders to said turbocharger, the total volume of said exhaust piping system is at least substantially equal to the displacement volume of the engine.

References Cited in the file of this patent

UNITED STATES PATENTS

| | | |
|---|---|---|
| 1,895,538 | Buchi | Jan. 31, 1933 |
| 2,350,784 | Lohner et al. | June 6, 1944 |
| 2,769,302 | Purdie et al. | Nov. 6, 1956 |
| 2,779,155 | Kauffmann et al. | Jan. 29, 1957 |